(12) United States Patent
Perkarsky et al.

(10) Patent No.: US 8,734,293 B1
(45) Date of Patent: May 27, 2014

(54) ACCUMULATOR FOR MAINTAINING HYDRAULIC PRESSURE FOLLOWING AN ENGINE RESTART

(71) Applicant: Ford Global Technologies, LLC, Dearborn, MI (US)

(72) Inventors: Lev Perkarsky, West Bloomfield, MI (US); Robert O. Burkhart, Novi, MI (US); Derek Kinch, Ypsilanti, MI (US); John Butwin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 13/706,631

(22) Filed: Dec. 6, 2012

(51) Int. Cl.
*B60W 10/06* (2006.01)

(52) U.S. Cl.
CPC .................................. *B60W 10/06* (2013.01)
USPC ........................................................ 477/115

(58) Field of Classification Search
CPC ..... B60W 10/06; B60W 20/00; B60W 10/08; F16H 2312/14
See application file for complete search history.

(56) References Cited

U.S. PATENT DOCUMENTS

| | | | |
|---|---|---|---|
| 7,798,271 B2 | 9/2010 | Schiele et al. | |
| 7,841,432 B2 | 11/2010 | Lynn et al. | |
| 8,056,666 B2* | 11/2011 | Portell et al. | 180/165 |
| 8,282,532 B2* | 10/2012 | Shirasaka et al. | 477/152 |
| 8,375,710 B2* | 2/2013 | Mellet et al. | 60/413 |
| 8,382,626 B2* | 2/2013 | Moorman et al. | 475/129 |
| 8,444,529 B2* | 5/2013 | Katou | 477/115 |
| 8,568,262 B2* | 10/2013 | Moorman et al. | 475/129 |
| 8,572,956 B2* | 11/2013 | Miyabe et al. | 60/417 |
| 8,585,548 B2* | 11/2013 | Zhang et al. | 477/110 |
| 8,585,549 B2* | 11/2013 | Katou | 477/115 |
| 8,591,365 B2* | 11/2013 | Moorman et al. | 475/129 |
| 8,591,381 B2* | 11/2013 | Zhang et al. | 477/150 |
| 8,596,440 B2* | 12/2013 | Neelakantan et al. | 192/85.63 |
| 8,636,614 B2* | 1/2014 | Moorman et al. | 475/127 |
| 8,639,424 B2* | 1/2014 | Lundberg et al. | 701/54 |
| 8,651,990 B2* | 2/2014 | Moorman et al. | 475/116 |
| 2010/0311538 A1* | 12/2010 | Miyabe et al. | 477/2 |
| 2011/0118081 A1 | 5/2011 | Moorman et al. | |
| 2011/0198178 A1 | 8/2011 | Lundberg et al. | |
| 2011/0226346 A1 | 9/2011 | Basin et al. | |
| 2012/0088631 A1* | 4/2012 | Zhang et al. | 477/52 |
| 2012/0118102 A1 | 5/2012 | Schultz | |

FOREIGN PATENT DOCUMENTS

| | | | |
|---|---|---|---|
| EP | 0047643 A1 | 3/1982 | |
| JP | 8014076 A | 1/1996 | |
| JP | 2007278435 A | 10/2007 | |

* cited by examiner

*Primary Examiner* — Dirk Wright

(74) *Attorney, Agent, or Firm* — James Dottavio; MacMillan, Sobanski & Todd, LLC

(57) ABSTRACT

A system for pressurizing transmission control elements includes an accumulator for containing pressurized fluid, first and second check valves, a booster valve supplied with accumulator pressure, and an actuator that causes the booster valve to open a fluidic connection between the accumulator and the control elements through the check valves in response to an engine restart signal.

17 Claims, 2 Drawing Sheets

ACCUMULATOR FOR MAINTAINING HYDRAULIC PRESSURE FOLLOWING AN ENGINE RESTART

BACKGROUND OF THE INVENTION

1. Field of the Invention

This invention relates generally to a hydraulic system having a hydraulic accumulator for an automatic transmission, and more particularly to an accumulator that maintains hydraulic pressure for immediate engagement of the transmission following an engine restart.

2. Description of the Prior Art

In order to improve the fuel economy of vehicles that use an internal combustion engine for propulsion, some vehicles employ a stop-start strategy wherein, when the vehicle is stopped at a traffic light, for example, the engine is automatically turned off. Then when the driver releases the brake pedal to apply pressure to the accelerator pedal, the engine is automatically started to allow the vehicle to accelerate. For such vehicles that also have an automatic transmission, a need arises to maintain hydraulic pressure in the transmission so that the transmission can engage immediately after the engine is automatically restarted, which will allow the vehicle to accelerate without hesitation.

In order to address this need, some vehicles employ an electric pump for pressurizing the hydraulic fluid rather than a conventional engine-driven pump. While this allows for the maintenance of hydraulic pressure while the engine is shut off, it may be more costly and require more packaging space than is desired. It also may require an additional battery to power the electric motor. A system of this type may also require continuous operation even when a pressure charge is not required due to a delay between a pump-motor startup and hydraulic pump prime time.

Another solution is to use a spring-loaded piston accumulator with a mechanical latch. This approach calls for control system redesign to package it internally. Such a spring-loaded accumulator may require one hundred percent capacity fluid charge in order to mechanically latch the accumulator's piston, which may present an issue when frequent engine stop-start events occur.

SUMMARY OF THE INVENTION

A system for pressurizing transmission control elements includes an accumulator for containing pressurized fluid, first and second check valves, a booster valve supplied with accumulator pressure, and an actuator that causes the booster valve to open a fluidic connection between the accumulator and the control elements through the check valves in response to an engine restart signal The system maintains a full hydraulic charge pressure while the engine is off (under stop-start operating conditions), thus allowing the transmission to engage immediately when the engine is automatically restarted by electronically commanding the solenoid. The control assembly can operate to minimize oil leakage from the accumulator and eliminate need for frequent recharges due to use of a poppet valve and a sealed pressure balance valve.

The control system can release stored fluid with a minimum delay after electronically commanded due to use of spring compressed by the pressure balance valve.

The control system operates over wide range of hydraulic pressures simultaneously using a low force solenoid and a pressure balance booster valve.

The control system minimizes hydraulic losses between the hydraulic accumulator and the transmission hydraulic passage by using hydraulic valves with large passages and sealing elements.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
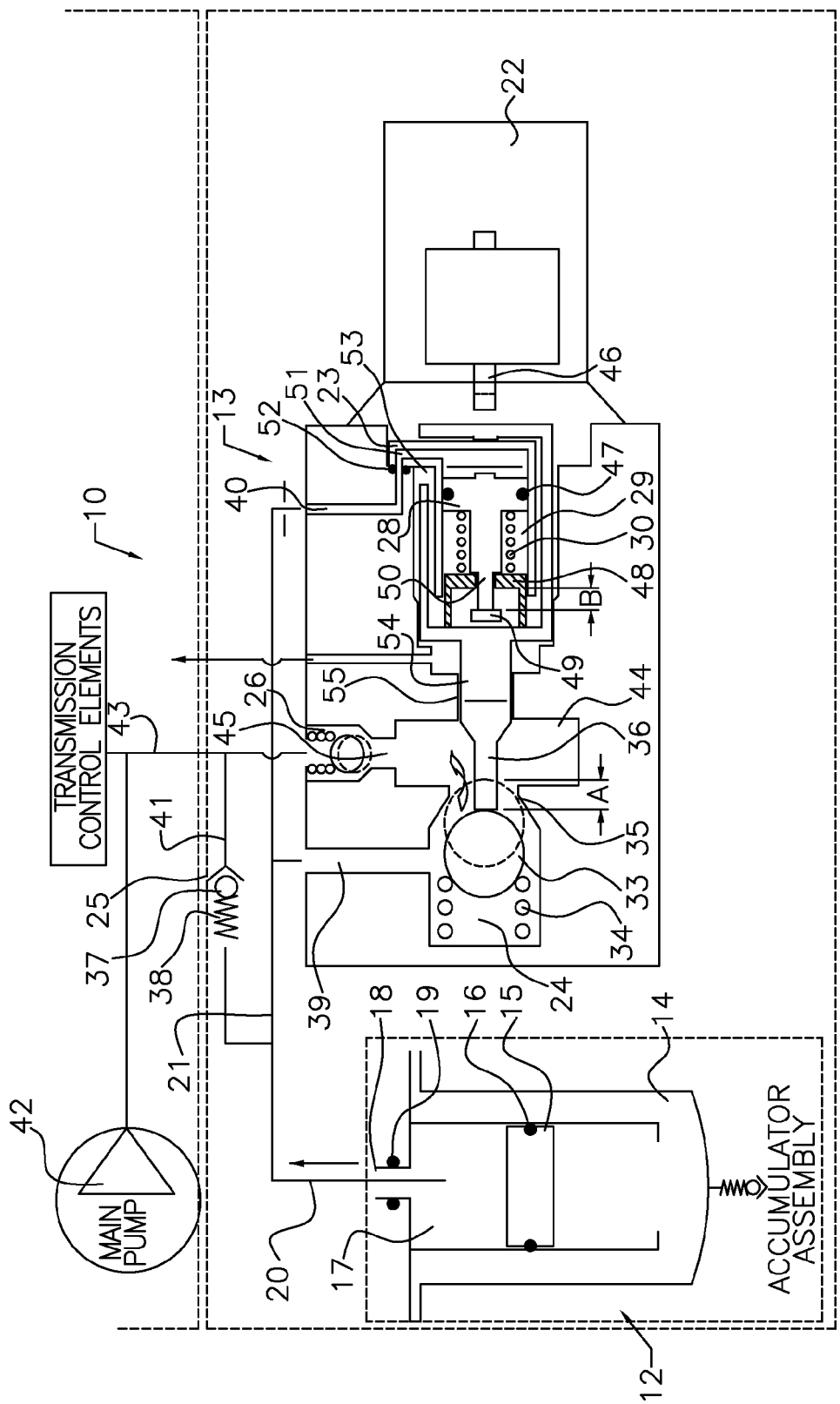
FIG. 1 is a schematic diagram of a hydraulic accumulator and hydraulic control system connected to a transmission hydraulic passage.

FIG. 1 illustrate a hydraulic accumulator system 10, which includes a hydraulic accumulator assembly 12 and accumulator control system 13, preferably mounted inside a transmission housing under a sealed cover. The cover is typically used to seal a transmission control system from environment in front wheel drive transmissions.

The hydraulic accumulator assembly 12 is formed integrally with a gas chamber 14, which includes a piston 15 with a seal 16 installed inside a hydraulic cylinder 17, which is permanently separates the hydraulic fluid from the compressed gas in gas chamber 14.

The hydraulic accumulator assembly 12 communicates hydraulically to the accumulator control system 13 through a screw thread 18, sealed by O-ring 19 and an accumulator passage 20, which connects hydraulic fluid in cylinder 17 to an accumulator hydraulic control passage 21.

The accumulator hydraulic control passage 21 communicated with the accumulator control system 13, which includes a solenoid 22, a pressure booster valve 23 (also known as a booster valve), a pilot check valve 24, a high pressure check valve 25 and a line check valve 26.

The pilot check valve 24 consist of a spring 34, ball 33, ball seat 35 and a pilot pin 36 partially located in the pressure booster valve 23.

The pressure booster valve 23 includes a piston 28, a cylinder 29, and a spring 30.

The high pressure check valve 25 includes a small ball 37, a high force spring 38 and valve bore guides.

The line check valve 26 consists from a low force spring, a ball approximately the same size as the ball 33 of the pilot check valve and check valve bore guides similar to the pilot check valve bore.

The accumulator passage 20 is connected simultaneously to the pilot check valve 24 apply passage 39 and the booster valve apply passage. The high pressure check valve 25 passage 41 is connected on the transmission main pump 42 supply side, to the transmission line pressure passage 43, and to the downstream side to the accumulator passage 20.

The pilot check valve 24 hydraulic exhaust passage 44 is connected to the line check valve 26 release passage 45 and through valve 26 to the transmission line pressure passage 43.

The housing of solenoid 22 is attached to the body of the accumulator control system 13 so that solenoid armature pin 46 has a minimum clearance between pin's end and the mating face of pilot pin 36.

The pressure balance valve piston 28 has a seal 47 creating a sealed hydraulic area "A". The pressure balance valve piston 28 is restricted in the axial direction by a sliding flange 48 and the booster valve spring 30. There is a small clearance between the piston 28 and the cylinder 29 in the as-installed condition. The sliding flange 48 is retained on the piston 28 by a shoulder 49.

The booster valve spring 30 compression is restricted by the piston 28 shoulder 50. The maximum travel of spring 30 is preferably smaller than the maximum travel of booster valve piston 28.

The pressure balance valve cylinder 29 has a side bracket 51 with a hydraulic passage sealed by an O-ring 52 against the accumulator control system 13 and connected with the hydraulic passage 40. The side bracket 51 is attached to accumulator control system 13 by fasteners.

The pressure booster valve 23 is enclosed into an internal opening formed inside the pilot pin 36 with the side bracket 51 protruding through a slot 53 formed into the pilot pin 36 internal opening walls. The slot 53 depth is sufficient to allow full booster valve piston stroke "A".

The booster valve pilot pin 36 spool 54 is free to move through an opening 55 made in the accumulator control body in a way that aligns the pilot pin 36, the booster valve spool 54 and the ball 33 of the pilot check valve. The end of booster valve pilot pin 36 should have a minimum allowable clearance with the ball surface.

The pressure balance valve piston 28 surface area Pa is equal or smaller than the area of the contact ring of the ball 33 of the pilot check valve and the seat in the accumulator control system 13. This will provide a counter hydraulic force toward the ball to balance the hydraulic force holding the ball 33 on the seat and minimize the force required from the solenoid 22.

The spool 54 cross sectional area Rpa should be equal to or smaller than that of the piston 28 surface area Pa to generate piston return force sufficient to reseat the ball 33.

Figure 2:
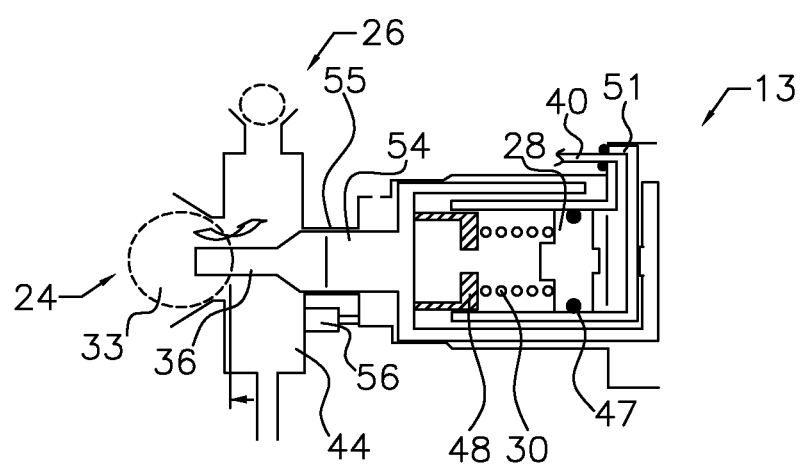
FIG. 2 is a schematic detailed view of a booster valve.

FIG. 2 illustrates an optional configuration, which includes an orifice 56 that provides additional means of allowing the ball 33 shown in FIG. 1 to reseat under high residual pressure conditions in the passage 44.

FIG. 2 also shows a simplified configuration where the booster valve spring 30 compression is not restricted by the piston 28, as shown in FIG. 1.

In operation the main pump 42 pressurizes the accumulator assembly 12 through the check valve 25 when the engine is initially started. The ball 33 of pilot check valve 24 and seal 47 tightly seal the pressure in accumulator 12 until the engine restart signal occurs. At this point the booster valve piston 28 is pressurized by accumulator 12 through booster valve apply passage 40 towards the ball 33 to balance the hydraulic forces on the ball. The spring 30 is compressed, storing energy to extend the ball 33 displacement beyond the immediate displacement of the pressure balance valve piston 28.

The solenoid 22 is energized when the engine restart signal is generated, adding enough force to unseat the ball 33 against the bias spring 34. The booster valve spring 30 further displaces the ball 33 beyond the stroke of the solenoid 22 to ensure a large flow opening into the exhaust passage 44 and then out to the transmission control element, i.e., clutches and brakes, ensuring their rapid refill as the main pump 42 is coming up to speed.

The accumulator assembly 12 holds the system pressure at a predefined level until the pressure at the outlet of the main pump 42 exceeds that held pressure and closes the line check valve 26. The main pump 42 pressure is controlled below the crack pressure of check valve 25 to prevent its flow reaching either the accumulator assembly 12 or the ball 33 until the ball 33 has reseated.

Electric current supplied to the solenoid 22 shuts off at a predetermined time to allow the ball 33 to reseat. Residual pressure in passage 44 acts on the end of the pilot pin 36 counterbalancing the pressure balance valve piston 28 forcing it toward the solenoid 22. This and the spring 34 will assist in moving the pressure balance valve piston 28 toward the solenoid 22 against the friction of the seal 47 and allowing the ball 33 to reseat.

The main pump 42 pressure is raised at a predetermined time to recharge the accumulator assembly 12 and reset the remainder of the accumulator control system 13.

In accordance with the provisions of the patent statutes, the preferred embodiment has been described. However, it should be noted that the alternate embodiments can be practiced otherwise than as specifically illustrated and described.

The invention claimed is:

1. A system for pressurizing transmission control elements, comprising:
    an accumulator for containing pressurized hydraulic fluid;
    first and second check valves;
    a booster valve supplied with accumulator pressure;
    an actuator that causes the booster valve to open a fluidic connection between the accumulator and the control elements through the check valves in response to an engine restart signal.

2. The system of claim 1, wherein the accumulator includes:
    a chamber containing compressed gas;
    a movable piston urged by pressure of the compressed gas to force hydraulic fluid from the accumulator.

3. The system of claim 1, wherein the accumulator closes a fluidic connection between the accumulator and the control elements upon expiration of a predetermined period occurring after the restart signal.

4. The system of claim 1, further comprising:
    the first check valve that opens and closes a connection between the accumulator and the second check valve in response to displacement of the actuator.

5. The system of claim 1, further comprising:
    a pump for supplying pressurized fluid to the accumulator;
    the second check valve that opens a connection between the accumulator and the control elements depending on a differential between accumulator pressure and pressure at an outlet of the pump provided the first check valve opens a connection between the second check valve and the accumulator, and closes a connection between the accumulator and the control elements when the first check valve closes a connection between the second check valve and the accumulator.

6. The system of claim 1, further comprising:
    a pump supplying pressurized fluid to the accumulator;
    a third check valve that opens and closes a connection between an outlet of the pump and the accumulator depending on a differential between accumulator pressure and pressure at the outlet of the pump.

7. The system of claim 1, further comprising:
    piston located in the booster valve, tending to open a connection between the accumulator and the control elements in response to accumulator pressure; and
    wherein the actuator is an electromagnetically-actuated solenoid that displaces the piston and opens the first check valve in response to said restart signal.

8. A system for pressurizing transmission control elements, comprising:
an accumulator for containing pressurized fluid;
first and second check valves;
a booster valve supplied with accumulator pressure;
an actuator that causes the booster valve to open a fluidic connection between the accumulator and the control elements through the check valves in response to an engine restart signal, and that closes said connection upon expiration of a predetermined period occurring after the restart signal.

9. The system of claim 8, further comprising:
the first check valve that opens and closes a connection between the accumulator and the second check valve in response to displacement of the actuator.

10. The system of claim 8, further comprising:
a pump for supplying pressurized fluid to the accumulator;
the second check valve that opens a connection between the accumulator and the control elements depending on a differential between accumulator pressure and pressure at an outlet of the pump provided the first check valve opens a connection between the second check valve and the accumulator, and closes a connection between the accumulator and the control elements when the first check valve closes a connection between the second check valve and the accumulator.

11. The system of claim 8, further comprising:
a pump supplying pressurized fluid to the accumulator;
a third check valve that opens and closes a connection between an outlet of the pump and the accumulator depending on a differential between accumulator pressure and pressure at the outlet of the pump.

12. The system of claim 8, further comprising:
a piston located in the booster valve, tending to open a connection between the accumulator and the control elements in response to accumulator pressure; and
wherein the actuator is an electromagnetically-actuated solenoid that displaces the piston and opens the first check valve in response to said restart signal.

13. A system for pressurizing transmission control elements, comprising:
an accumulator;
a pump for supplying pressurized fluid to the accumulator;
a booster valve supplied with accumulator pressure;
an actuator that causes the booster valve to open a fluidic connection between the accumulator and the control elements in response to an engine restart signal;
a first check valve that opens and closes a connection between the accumulator and a second check valve in response to displacement of the actuator;
the second check valve opens a connection between the accumulator and the control elements depending on a differential between accumulator pressure and pressure at an outlet of the pump provided the first check valve opens a connection between the second check valve and the accumulator.

14. The system of claim 13, wherein the second check valve closes a connection between the accumulator and the control elements when the first check valve closes a connection between the second check valve and the accumulator.

15. The system of claim 13, wherein the actuator closes a connection between the accumulator and the control elements upon expiration of a predetermined period occurring after the restart signal.

16. The system of claim 13, further comprising a third check valve that opens and closes a connection between an outlet of the pump and the accumulator depending on a differential between accumulator pressure and pressure at the outlet of the pump.

17. The system of claim 13, further comprising:
a piston located in the booster valve, tending to open a connection between the accumulator and the control elements in response to accumulator pressure; and
wherein the actuator is an electromagnetically-actuated solenoid that displaces the piston and opens the first check valve in response to said restart signal.

\* \* \* \* \*